(12) United States Patent
Astigarraga et al.

(10) Patent No.: US 8,948,020 B2
(45) Date of Patent: Feb. 3, 2015

(54) DETECTING AND ISOLATING DROPPED OR OUT-OF-ORDER PACKETS IN COMMUNICATION NETWORKS

(71) Applicant: International Business Machines Corporation, Armonk, NY (US)

(72) Inventors: Tara Astigarraga, Rochester, NY (US); Michael E. Browne, Staatsburg, NY (US); Louie A. Dickens, Tucson, AZ (US); Justin F. Paugh, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 13/710,844

(22) Filed: Dec. 11, 2012

(65) Prior Publication Data

US 2014/0160952 A1 Jun. 12, 2014

(51) Int. Cl.
*G06F 11/00* (2006.01)
*H04L 1/00* (2006.01)
(Continued)

(52) U.S. Cl.
CPC ............ *H04L 43/10* (2013.01); *H04L 67/1097* (2013.01); *G06F 3/067* (2013.01); *H04L 49/357* (2013.01); *H04L 43/0835* (2013.01); *H04L 43/0847* (2013.01); *H04L 43/16* (2013.01)
USPC .......................... 370/241; 370/241.1; 370/242

(58) Field of Classification Search
CPC ....................................................... H04L 43/08
USPC .............. 370/241, 241.1, 242, 248, 252, 253, 370/254; 714/776
See application file for complete search history.

(56) References Cited

U.S. PATENT DOCUMENTS 6,601,195 B1 7/2003 Chirashnya et al.
7,656,812 B2 2/2010 Tadimeti et al.
(Continued)

FOREIGN PATENT DOCUMENTS

JP 60128740 7/1985
JP 2012199719 A 10/2012
WO 2008126179 A1 10/2008

OTHER PUBLICATIONS

Japan Patent Office, "Notification of Transmittal of the International Search Report and the Written Opinion of the International Searching Authority, or the Declaration," Jan. 28, 2014, International Application No. PCT/JP2013/006425.
(Continued)

*Primary Examiner* — Chuong T Ho
(74) *Attorney, Agent, or Firm* — Patricia B. Feighan; Steven Chiu

(57) ABSTRACT

A processor-implemented method for analyzing dropped or out of order data packets that are sent from an initiating device over a communications network is provided. The processor-implemented method may include receiving, by a processor, a predetermined plurality of test data packets from the initiating device over the communications network. At least one of the predetermined plurality of test data packets that are dropped or received out of order may be determined by the processor. A header portion corresponding to the at least one of the predetermined plurality of test data packets that are dropped or received out of order may then be accessed. The accessed header portion is sent, by the processor, to the initiating device, whereby the accessed header portion may include information associated with a device location at which the one or more of the predetermined plurality of test data packets are dropped or received out of order.

17 Claims, 7 Drawing Sheets

(51) Int. Cl.
*H04L 12/26* (2006.01)
*H04L 29/08* (2006.01)
*G06F 3/06* (2006.01)
*H04L 12/931* (2013.01)

(56) References Cited

U.S. PATENT DOCUMENTS

| | | | |
|---|---|---|---|
| 7,801,127 B2 | 9/2010 | Beeson et al. | |
| 7,877,436 B2 | 1/2011 | Arimilli et al. | |
| 7,899,323 B2 | 3/2011 | Underwood et al. | |
| 8,023,419 B2 | 9/2011 | Oran | |
| 8,045,478 B2 | 10/2011 | Stephan et al. | |
| 2002/0188839 A1* | 12/2002 | Noehring et al. | 713/153 |
| 2007/0189305 A1* | 8/2007 | Fujimoto et al. | 370/395.42 |
| 2008/0049634 A1 | 2/2008 | Goyal et al. | |
| 2008/0232261 A1 | 9/2008 | Tsuzaki et al. | |
| 2009/0074406 A1* | 3/2009 | Wurst | 398/25 |
| 2009/0290500 A1* | 11/2009 | Nishi et al. | 370/246 |
| 2009/0327844 A1* | 12/2009 | Suneya | 714/776 |
| 2010/0064022 A1 | 3/2010 | Asano | |
| 2012/0069845 A1* | 3/2012 | Carney et al. | 370/392 |
| 2013/0301424 A1* | 11/2013 | Kotecha et al. | 370/242 |

OTHER PUBLICATIONS (Source: IPCOM), Disclosure No. IPCOM000005376D dated Sep. 1, 2001. "A Method for Monitoring Traffic in Switched and Routed Networks".

* cited by examiner

DETECTING AND ISOLATING DROPPED OR OUT-OF-ORDER PACKETS IN COMMUNICATION NETWORKS

FIELD OF THE INVENTION

The present invention relates to network communications, and more particularly, to monitoring the transfer of data packets within networks.

BACKGROUND OF THE INVENTION

During the communication of data over one or more networks, data packets may be dropped or delivered out of sequence. In both cases, additional processing may be required in order to either re-sequence out of order data packets or recover lost or dropped data packets.

For example, in Storage Area Network (SAN), Data Center Ethernet (DCE), or Fiber Channel over Ethernet (FCoE) environments the system complexity, multiple fabric hops, path choices, and system components may introduce challenges with respect to debugging dropped or out of order data packets or frames. The process of determining dropped or out of order packets may, for example, involve monitoring each port or network element (e.g., cable, connector, repeater, transceiver, switch, etc.) along the host to target communication path in order to identify a port or network element causing the failure.

SUMMARY OF THE INVENTION

It may, therefore, be advantageous to provide a method and system to identify one or more locations within a network that cause data packets or frames to be either dropped or received out of sequence and to subsequently capture the header information associated with the dropped or out of sequence data packets.

According to one embodiment of the invention, a processor-implemented method for analyzing dropped or out of order data packets that are sent from an initiating device over a communications network is provided. The processor-implemented method may include receiving, by a processor, a predetermined plurality of test data packets from the initiating device over the communications network. At least one of the predetermined plurality of test data packets that are dropped or received out of order may be determined by the processor. A header portion corresponding to the at least one of the predetermined plurality of test data packets that are dropped or received out of order may then be accessed by the processor. The accessed header portion is sent by the processor to the initiating device, whereby the accessed header portion may include information associated with a device location at which the one or more of the predetermined plurality of test data packets are dropped or received out of order.

According to another embodiment of the invention, a processor-implemented method for analyzing dropped or out of order data packets that are sent from an initiating device over a communications network is provided. The processor-implemented method may include monitoring, by a processor, a plurality of ports corresponding to a network communication device over the communication network. A defined threshold may be set, by the processor, for a number of dropped or out of order data packets in an exchange with the network communication device. The processor-implemented method may include receiving, by the processor, a plurality of data packets in the exchange from the initiating device to the network communication device via the communications network. At least one of the data packets in the exchange that are dropped or received out of order may be determined by the processor. A header portion corresponding to the at least one of the data packets in the exchange that are dropped or received out of order may be accessed by the processor. The accessed header portion includes information associated with the network communication device at which the one or more of the data packets in the exchange are dropped or received out of order. The accessed header portion is written by the processor into a table or log on the network communication device. The accessed header portion is sent by the processor to the initiating device.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION OF THE INVENTION

Figure 1:
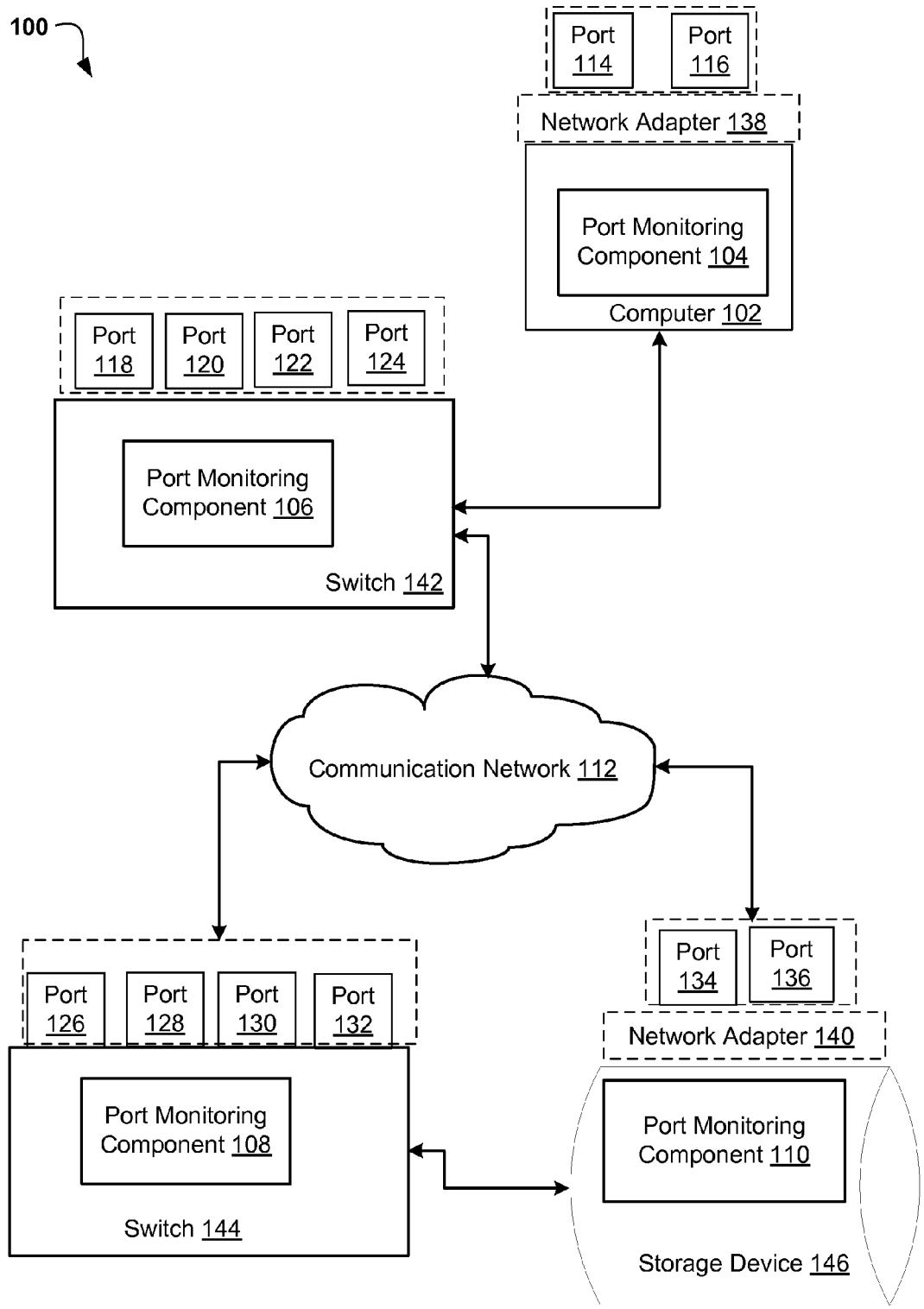
FIG. 1 illustrates a network architecture in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following described exemplary embodiments identify dropped or out of sequence data packets at one or more network devices within a communications network. Referring to FIG. 1, an exemplary network architecture 100 in accordance with one embodiment is depicted. The network architecture 100 may include a computer 102, switches 142 and 144, a storage device 146, and a communication network 112.

As shown in FIG. 1, port monitoring software 104 may be executed on and initiated from a host such as, computer 102. The computer 102 may be connected to a network adapter 138 that has ports 114, 116. The computer may communicate with a switch 142 that has ports 118-124 and is also running port monitoring software 106.

The switch 144 may communicate with storage device 146 via communication network 112. The storage device 146 may also run port monitoring software 110 and is connected to a network adapter 140 that has ports 134, 136. The switches 142, 144 may, for example, include network bridges that connect various network devices such as computer 102 and storage device 146. The switches 142, 144 have ports 118-132. The port may be one of several network connecting points inside the networking adapter or the switch that connects to the communication network.

As described in the following paragraphs, a data packet monitoring process (see FIG. 3A-3B) may monitor a specified number of transmitted data packets sent from a host such as computer 102. In this embodiment, not all ports are engaged in the data packet monitoring process. Alternatively, according to another exemplary data packet monitoring process (see FIG. 4A-4B), all ports may be monitored for out of order or dropped data packets within an exchange. An exchange may, for example, be a series of one or more non-concurrent information sequences communicated between two ports. The information sequence may be a group of related data packets transmitted unidirectionally from one port to another. The sequences may occur in either direction. An exchange may be bidirectional or unidirectional. It will be appreciated that the network connections shown are exemplary and other means of establishing a communications link between the computers may be used.

FIG. 1 further shows that a communications network may be a collection of computers, links, storage devices, switches and ports which connect to enable telecommunication between users of the computers. Each computer in the network has a unique address so messages or data packets can be routed to the correct recipients.

Figure 2:
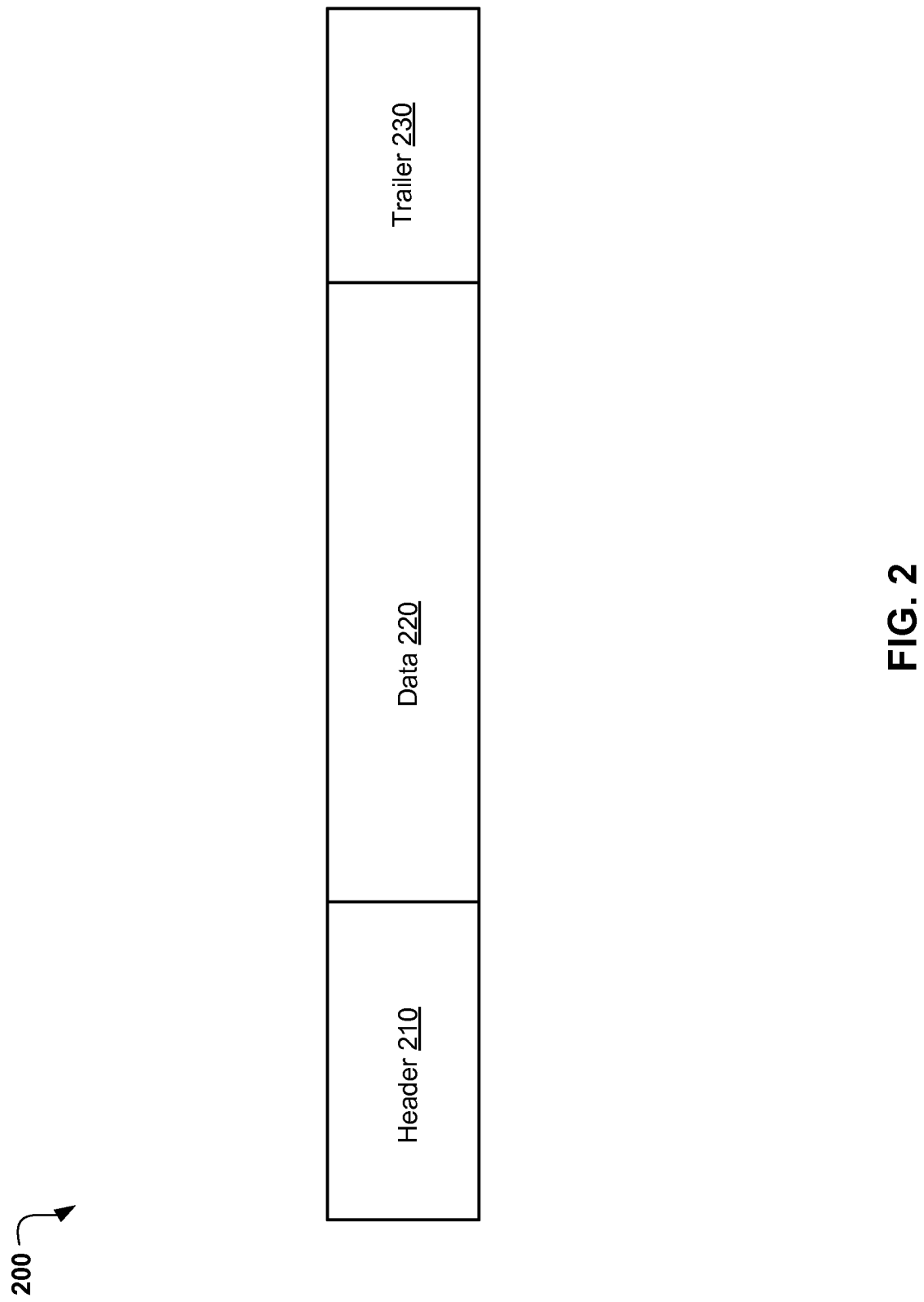
FIG. 2 illustrates an exemplary data packet in accordance with an embodiment of the present invention.

As shown in FIG. 2, an exemplary data packet 200 may be a unit of communication utilized over the network. The data packet may include a header portion 210, a data portion 220 and a trailer portion 230. The header portion of the data packet may include, among other things, source and destination addresses, error detection codes, source id, destination id, sequence information, exchange information, and port information (e.g., world wide port name). The data portion of the data packet is often referred to as the payload and the trailer portion marks the end of the data. For example, if dropped or out of order packets are detected using the exemplary flowcharts shown in FIGS. 3A-3B and 4A-4B, then the header portion of the data packet 210 (FIG. 200) may be written to a table or a log on the switch and subsequently sent to the initiator which could be the host and/or central monitoring software.

Figure 3A:
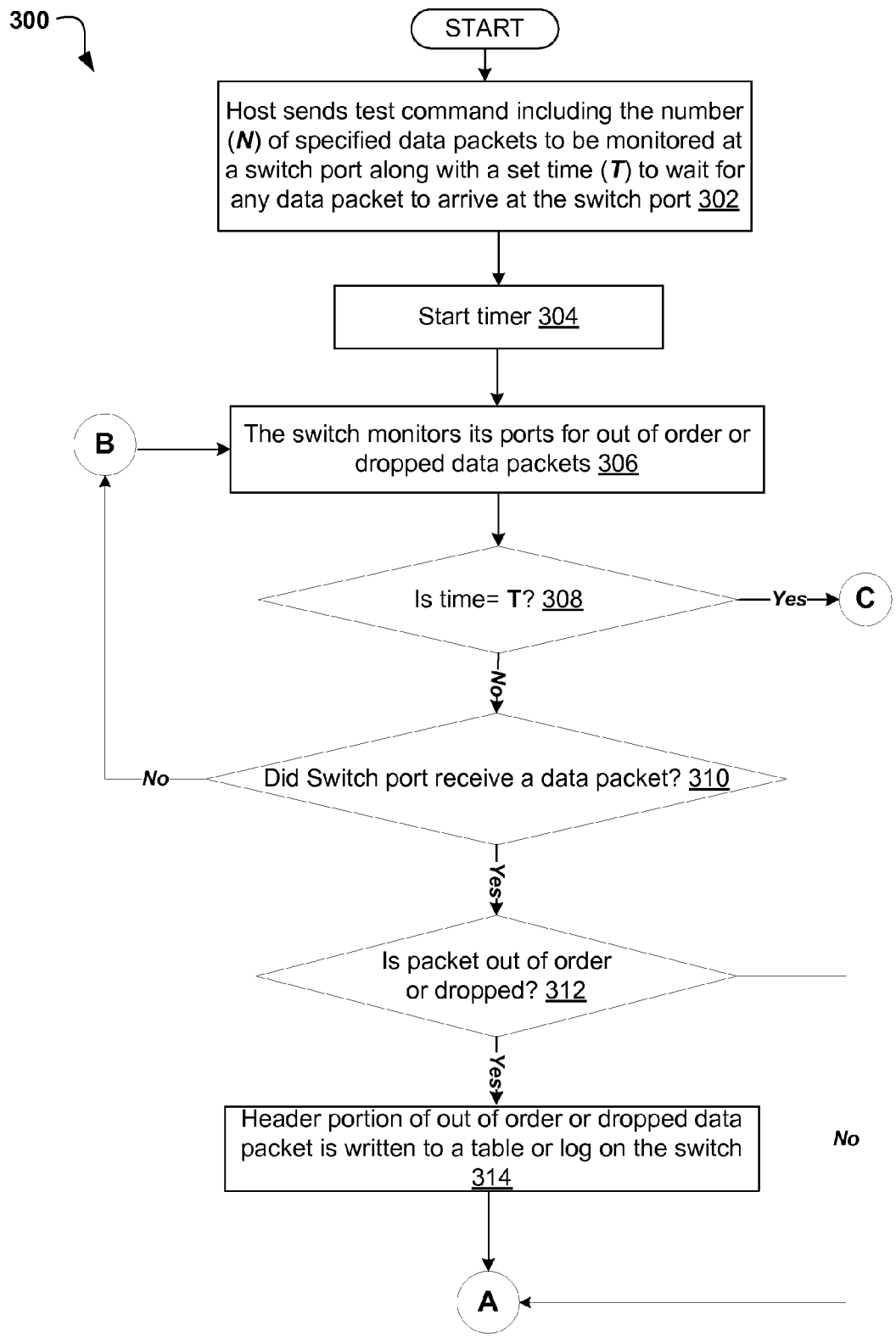
FIGS. 3A-3B is a flow chart illustrating a method to monitor a predetermined number of transmitted data packets in accordance with an embodiment of the present invention.
Figure 3B:
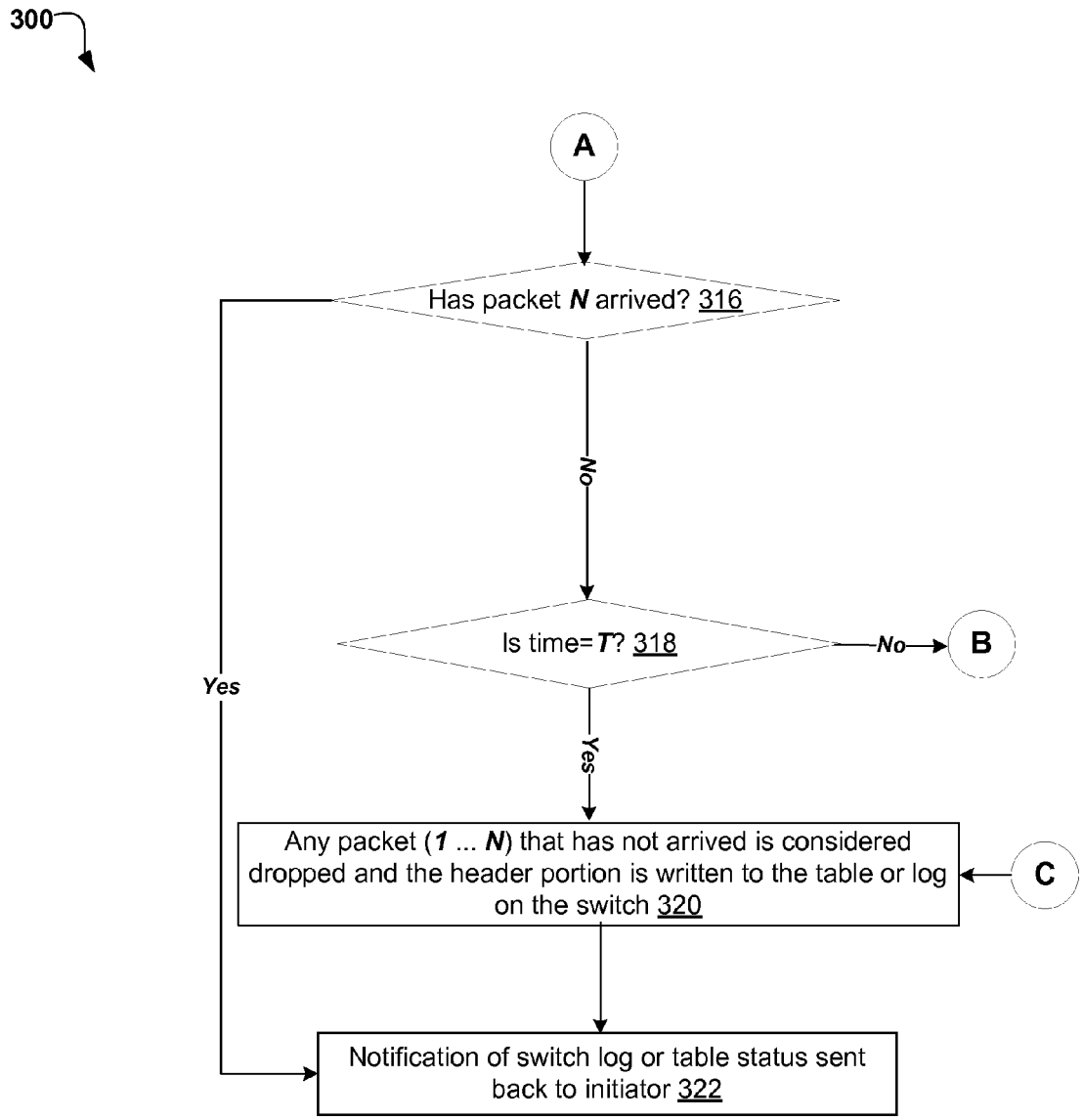

FIGS. 3A and 3B illustrate an operational flowchart 300 for a port monitoring component associated with communications equipment within a network, according to an embodiment of the present invention. Flowchart 300 may be described with the aid of the system architecture 100 shown in FIG. 1. As previously indicated, the initiating device may be a computer 102, as illustrated in FIG. 1.

At 302, a host sends a test command that includes a predefined number (i.e., N) of data packets, which are transmitted from the host to one or more switch ports associated with a switch device within the network. At 302, a time limit (i.e., T) is also set to determine how long to wait for the test scenario to run. For example, the port monitoring component 104 (FIG. 1) within host computer 102 (FIG. 1) may generate and send a test command having, for example, a thousand data packets (i.e., N=1000) to switch device 142 (FIG. 1). Also, the test scenario may be set to run for fifteen minutes (i.e., T=15). Alternatively, the port monitoring component 104 (FIG. 1) within host computer 102 (FIG. 1) may generate and send a test command to switch device 144 (FIG. 1) or storage device 146 (FIG. 1).

At 304, the timer is started upon the sending of the test command packets. For example, the port monitoring component 104 (FIG. 1) within host computer 102 (FIG. 1) may activate a timer associated with switch 142 (FIG. 1) in order to determine an amount of time for the switch 142 (FIG. 1) to wait before any of the data packets associated with the test command are considered dropped. For example, as previously stated, the time limit (T) to wait could be set to fifteen minutes. Therefore, after fifteen minutes has elapsed, the test scenario would end and any data packets that did not arrive are considered dropped.

At 306, a switch device monitors the received data packets at its ports in order to determine whether they are received out of order and/or dropped (i.e., lost). For example, a port monitoring component 106 (FIG. 1) running on switch 142 (FIG. 1) may monitor its port cards for determining out of order and/or dropped data packets. Then at 308, the timer is checked to determine whether the predetermined amount of time for the test scenario to run has elapsed. If the predetermined amount of time for the test scenario to run has elapsed (308), at 320, any data packets that have not arrived may be considered dropped. Thus, the header portions of the data packets that are designated as being dropped are written to a table or log on the switch (320). For example, if the time limit (T-15 minutes) expires and one or more packets have not arrived at port 120 (FIG. 1) of switch 142 (FIG. 1), then the port monitoring component 106 (FIG. 1) will write the header portions corresponding to the one or more packets that have not arrived and, therefore, considered dropped.

As previously indicated, the header portion of any dropped and/or out of order data packet may be written to the table or log on the switch, whereby the header portion may include information, such as the source id, destination id, sequence information, exchange information, and port information, such as, the world wide port name. A data packet may be dropped if any of the header information (i.e., one or more header fields) is corrupt. A corruption would include any portion of the header information that is missing, invalid or not readable. For example, if the destination id is corrupt, then the data packet may be dropped. In such a scenario, any data packets that are considered dropped may be delayed in the switch buffer before it is dropped. Therefore, their corresponding header portions may be accessed and written to the table or log on the switch prior to being dropped. In the event, however, that the header portion cannot be obtained for a dropped data packet, then only the port information may be written into the table or log on the switch. For example, if a data packet does not stay or arrive in the buffer of switch 142 (FIG. 1) long enough for the port monitoring component 106 (FIG. 1) to access the header information before the data packet is dropped, then only the port information may be written to the table or log on the switch 142 (FIG. 1) without the other details of the header portion. In addition, the header portion of the next received data packet may also be sent with the header portion of the dropped packet having only switch port information in its header. This data packet would arrive out of order based on the sequence information since the previous data packet was dropped. Therefore, the header information of this data packet may be sent along with the header and switch port information pertaining to the dropped data packet.

At 322, if it is determined that no data packets in the specified range were dropped or received out of order during the test scenario, then a status notification may be sent back to the initiator indicating that no data packets were dropped or received out of order from the switch. In the event that header information associated with dropped or out of sequence data packets is stored in the switch table or log, such header information from the table or log is also sent back to the initiator for evaluation.

If the predetermined time (T) has not elapsed (308), then the port monitoring component 106 (FIG. 1) of the switch 142 (FIG. 1) would continue to monitor for out of order or dropped data packets (310). At 310, if no data packets were received by the switch 142 (FIG. 1), then the port monitoring component 106 (FIG. 1) of the switch 142 (FIG. 1) would continue to receive and monitor for out of order or dropped data packets (306) until the predetermined time limit (e.g., T=15 mins) has elapsed (308).

If the switch receives a data packet (310), then the port monitoring component 106 (FIG. 1) of the switch 142 (FIG. 1) determines whether any data packets at the switch port are out of order and/or dropped (312). For example, the port monitoring component 106 (FIG. 1) on the switch 142 (FIG. 1) may monitor port 120 (FIG. 1) in order to determine whether any data packets at the switch port 120 (FIG. 1) are out of order and/or dropped. Out of order data packets may be determined using the sequence number information in the header portions. For example, if the received data packet has a sequence number of DSN=5 and the following received data packet has a sequence number of DSN=8, then an out of order sequence determination is established within the port monitoring component by, for example, comparing the sequence numbers. According to one implementation, the header portion of the data packet corresponding to sequence number DSN=8 may be written to the switch log or table. According to another implementation, the header portion of both data packets corresponding to sequence numbers DSN=5 and DSN=8 may be written to the switch log or table. By receiving the header information for both data packets corresponding to sequence numbers DSN=5 and DSN=8, it may be determined that data packets corresponding to DSN=6 and DSN=7 are out of sequence.

If a data packet at, for example, switch port 120 (FIG. 1) is determined to be out of order and/or dropped (312), the port monitoring component 106 (FIG. 1) may write the header portion of the out of order or dropped data packet into a table or log on the switch 142 (FIG. 1) (314). The header portion may include information, such as the source id, destination id, sequence information, and exchange information. The written header portion may additionally include port information, such as, the world wide port name of the switch (e.g., FIG. 1: switch 142) where the packet was dropped or out of order. For example, the world wide port name of the switch 142 (FIG. 1) may be added to the header portion of the out of order or dropped packet by the port monitoring component 106 (FIG. 1) on the switch 142 (FIG. 1). In the event that the header portion cannot be obtained for a dropped data packet, then only the port information may be written into the table or log on the switch. For example, if a data packet does not stay in the buffer of switch 142 (FIG. 1) long enough for the port monitoring component 106 (FIG. 1) to access the header information before the data packet is dropped, then only the port information may be written to the table or log on the switch without the other details of the header portion. In addition, the header portion of the last received data packet may also be sent with the header portion of the dropped packet having only switch port information in its header.

As previously described, the header portion may include information, such as the source id, destination id, sequence information, exchange information, and port information, such as, the world wide port name. Using this information, for example, a network administrator may be able to isolate the location of dropped or out of order data packets within the switch fabric (e.g., Fiber Channel over Ethernet: FCoE). In addition, the administrator may be able to ascertain certain source or destinations that are more prone to packet loss or sequence issues.

At 316, the port monitoring component 106 (FIG. 1) will determine if the last data packet (N) has arrived. At 318, the timer is checked again to determine whether the predetermined amount of time (T) for the test scenario to run has elapsed. For example, the port monitoring component 106 (FIG. 1) on the switch 142 (FIG. 1) may determine if the data packet received is number N (e.g., N=1000), where N is the last data packet in the predefined number (N) of specified data packets sent by the test commend (316). If the last packet has arrived (316), then a status notification may be sent back to the initiator indicating whether any data packets were dropped or received out of order from the switch (322).

If the last packet has not arrived (316), then at 318, it is determined whether the timer has reached the predefined limit of, for example, T=15 minutes (318). If the timer has not reached the predefined limit (e.g., T=15 minutes), the port monitoring 106 (FIG. 1) of switch 142 (FIG. 1) may continue to monitor the ports (e.g., FIG. 1: ports 118-124) for out of order or dropped data packets (306) If the timer has reached the predefined limit (e.g., T=15 minutes), then any data packets that have not arrived may be considered dropped. Thus, the header portions of the data packets that are designated as being dropped are written to a table or log on the switch (320). At 322, header information associated with dropped and/or out of order data packets that are stored in the switch table or log may be sent back to the initiator for evaluation.

In an alternative embodiment, rather than the notification being sent to the initiator, the initiator may query the log on the switch in order to obtain the information recorded in the table or log. If the port monitoring component process 300 depicted in FIGS. 3A-3B does not yield any out of order or dropped data packets and the initiator does not want to execute the test command again with new parameters, then an alternative port monitoring component process 400, as shown in FIGS. 4A-4B, may be implemented.

Figure 4A:
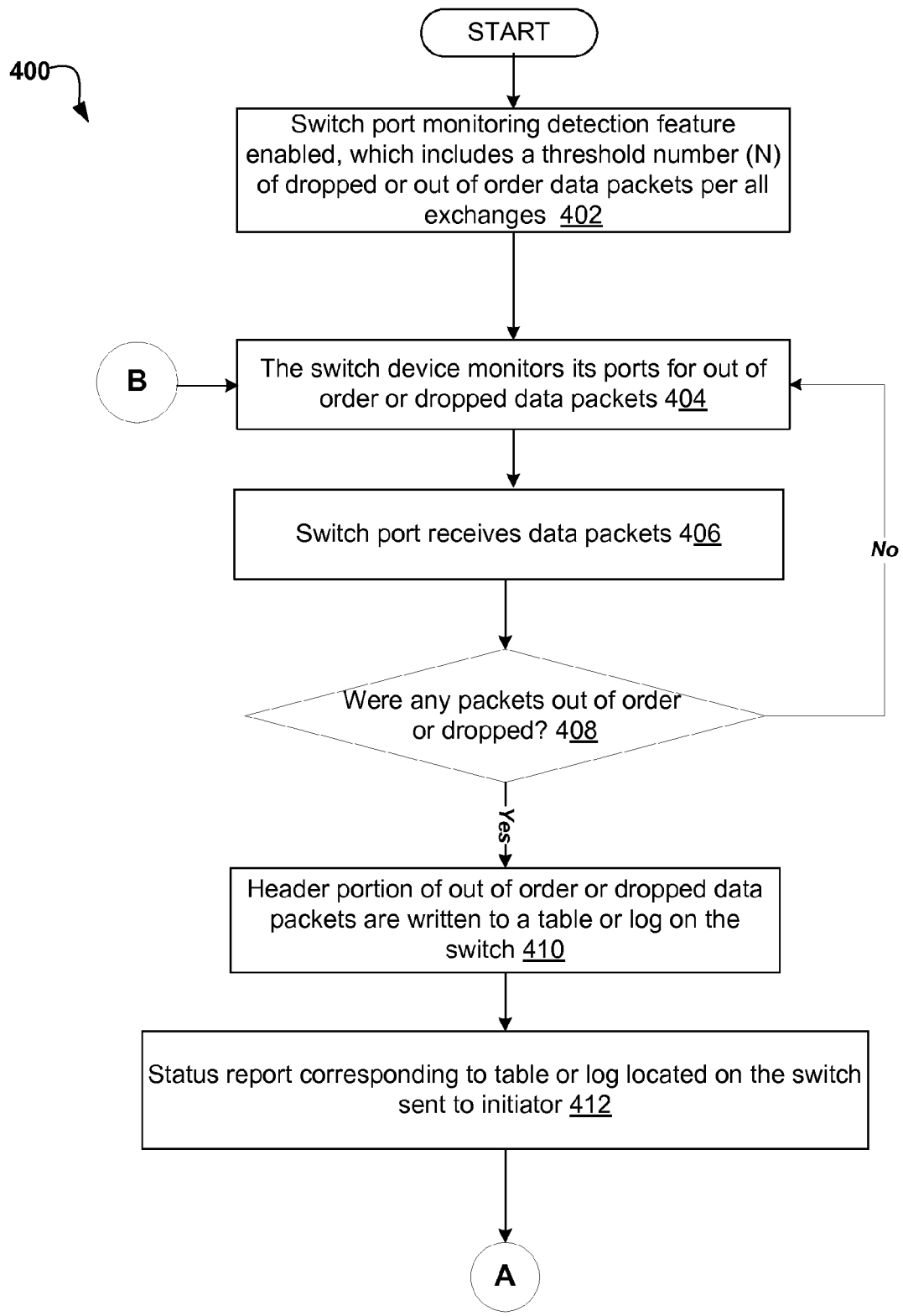
FIGS. 4A-4B is a flow chart illustrating a method to monitor transmitted data packets during an exchange in accordance with an embodiment of the present invention.
Figure 4B:
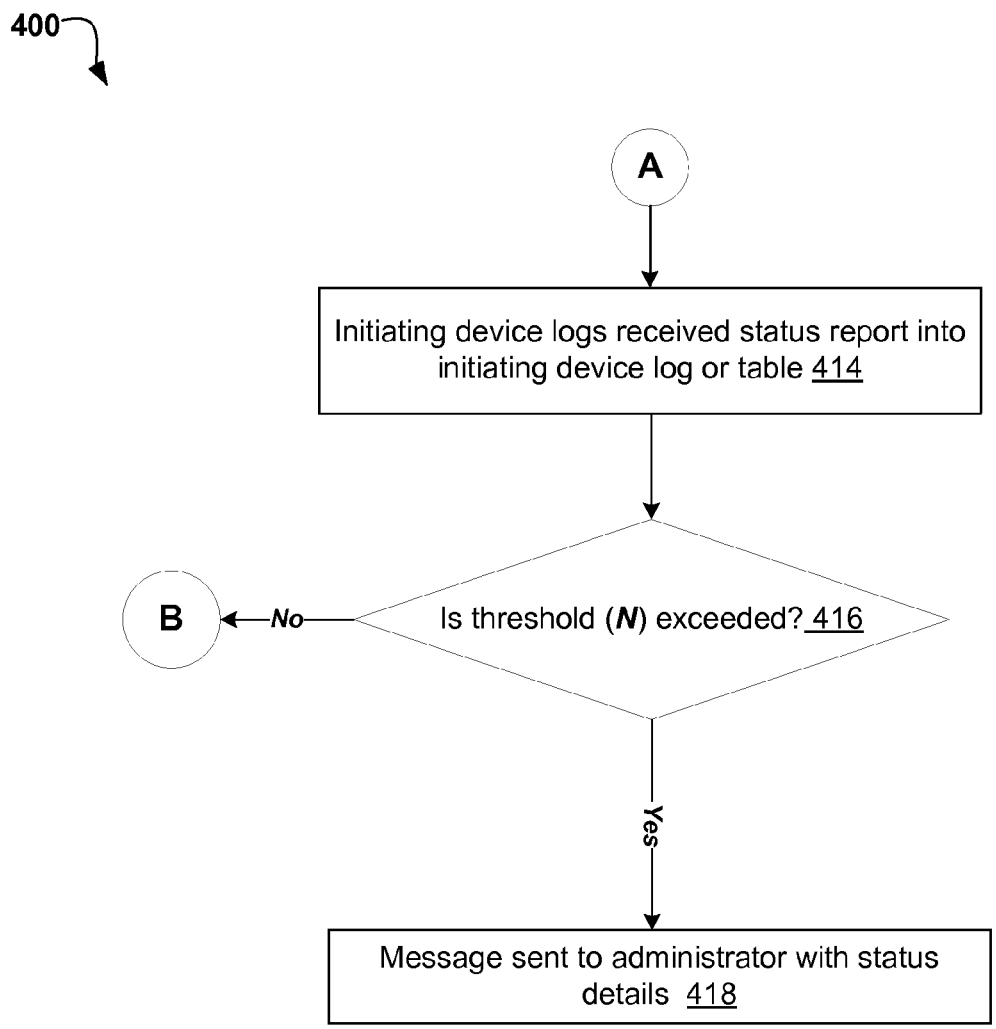

FIGS. 4A and 4B illustrate an alternative operational flowchart 400 of a port monitoring component that monitors the communication network while data traffic continues to flow, according to an embodiment of the present invention. Flowchart 400 may be described with the aid of the system architecture 100 shown in FIG. 1. As previously indicated, the initiating device may be a computer, as illustrated in FIG. 1. It may be appreciated that in the embodiment of FIGS. 3A-3B, the data packets were test packets generated by a test command. Alternatively, in the embodiment of FIGS. 4A-4B, the monitoring process is implemented using live data going through the switch fabric.

The port monitoring component process 400 may be run independently or subsequently to port monitoring component process 300. At 402, a switch port monitoring detection feature is enabled that would begin monitoring the activity of all the ports for dropped and/or out of order data packets in an exchange. For example, the port monitoring component 102 (FIG. 1) within host computer 102 (FIG. 1) may enable a detection feature on switch device 144 (FIG. 1). The port monitoring component 106 (FIG. 1) within switch 142 will begin monitoring each port 118-124 (FIG. 1) for out of order and/or dropped data packets per exchange. As previously described, an exchange may, for example, be a series of one or more nonconcurrent information sequences communicated between two ports. The information sequence may be a group of related data packets transmitted unidirectionally from one port to another.

At 402, a threshold number is also set to determine the number of dropped and/or out of order data packets per all the exchanges that exceeds normal activity. According to some standards, an acceptable BER (Bit Error Rate) may be 1 in $10^{12}$ which equates to 1 bit error in 1,000,000,000,000 bits. This standard may apply across all exchanges using industry timers, such as the Error Detect TimeOut Value (E_D_TOV) and the Resource Allocation TimeOut Value (R_A_TOV). E_D_TOV is the basic error timeout used for all Fibre Channel detection. Its default value is 2 seconds. R_A_TOV is the amount of time given to devices to allocate the resources needed to process received frames. Its default value is 10 seconds. For example, the threshold (T) may be set to 2,000,000,000,000 since it is determined that the industry standard for the average number of dropped or out of order data packets per all exchanges is less than 2,000,000,000,000. At 404, the switch device monitors the received data packets at its ports to determine whether they are received out of order and/or dropped (i.e., lost). For example, the port monitoring component 106 (FIG. 1) running on the switch 142 (FIG. 1) may monitor its port cards for determining out of order and/or dropped data packets within an exchange.

If the switch receives a data packet (406), then the port monitoring component 106 (FIG. 1) of the switch 142 (FIG. 1) determines whether any data packets in an exchange at the switch port are out of order and/or dropped (408). For example, the port monitoring component 106 (FIG. 1) on the switch 142 (FIG. 1) may monitor port 120 (FIG. 1) in order to determine whether any data packets in an exchange at the switch port 120 (FIG. 1) are out of order and/or dropped.

As previously described, a dropped data packet may be any data packet that does not arrive at the switch port as a result of, for example, being delayed in a queue or buffer. An out of order data packet may be determined using the sequence number information in the header portions of the data packets that have arrived at the switch port. For example, if the received data packet has a sequence number of DSN=5 and the following received data packet has a sequence number of DSN=8, then an out of order sequence determination is established within the port monitoring component by, for example, comparing the sequence numbers. According to one implementation, the header portion of the data packet corresponding to sequence number DSN=8 may be written to the switch log or table. According to another implementation, the header portion of both data packets corresponding to sequence numbers DSN=5 and DSN=8 may be written to the switch log or table. By receiving the header information for both data packets corresponding to sequence numbers DSN=5 and DSN=8, it may be determined that data packets corresponding to DSN=6 and DSN=7 are out of sequence.

At 408, if no data packets received by the switch 142 (FIG. 1) were out of order and/or dropped, then the port monitoring component 106 (FIG. 1) would continue to receive and monitor for out of order and/or dropped data packets within an exchange (404).

If a data packet in an exchange at, for example, switch port 120 is determined to be out of order and/or dropped (408), the port monitoring component 106 (FIG. 1) may write the header portion of the out of order or dropped data packet into a table or log on the switch 142 (FIG. 1) (410).

The header portion may include information, such as the source id, destination id, sequence information, and exchange information. The written header portion may additionally include port information, such as, the world wide port name of the switch (e.g., FIG. 1: switch 142) where the packet was dropped or out of order. For example, the world wide port name of the switch 142 (FIG. 1) may be added to the header portion of the out of order or dropped packet by the port monitoring component 106 (FIG. 1) on the switch 142 (FIG. 1). A data packet may be dropped if any of the header information is corrupt. A corruption would include any portion of the header information that is missing, invalid or not readable. For example, if the destination id is corrupt, then the data packet may be dropped. In such a scenario, any data packets that are considered dropped may be delayed in the switch buffer before it is dropped. Therefore, their corresponding header portions may be accessed and written to the table or log on the switch prior to being dropped. In the event, however, that the header portion cannot be obtained for a dropped data packet, then only the port information may be written into the table or log on the switch. In addition, the header portion of the last received data packet may also be sent with the header portion of the dropped packet having only switch port information in its header.

For example, if a data packet does not stay in the buffer of switch 142 (FIG. 1) long enough for the port monitoring component 106 (FIG. 1) to access the header information before the data packet is dropped, then only the port information may be written to the table or log on the switch without the other details of the header portion. In addition, the header portion of the next received data packet may also be sent with the header portion of the dropped packet having only switch port information in its header. This data packet would arrive out of order based on the sequence information since the previous data packet was dropped. Therefore, the header information of this data packet may be sent along with the header and switch port information pertaining to the dropped data packet.

At 412, a status report corresponding to the table or log located on the switch may be sent back to the initiator for evaluation. The status report may include header information associated with dropped and/or out of order data packets that are stored in the switch table. For example, if the port monitoring component 106 (FIG. 1) of switch 142 (FIG. 1) detects out of order or dropped data packets within an exchange, then the port monitoring component 106 (FIG. 1) will write the header information from the dropped and/or out of order data packets into a log or table on the switch 142 (FIG. 1). Then the port monitoring component 106 (FIG. 1) of switch 142 (FIG. 1) will send the contents of the table or the log to the initiating device, such as computer 102 (FIG. 1). The port monitoring component 104 (FIG. 1) of computer 102 (FIG. 1) receives the status report and writes the report into a log or table 414.

At 416, the port monitoring component 104 (FIG. 1) of computer 102 (FIG. 1) will check if the predetermined threshold (T) has been exceeded for the number of dropped and/or out of order data packets per exchange on the switch ports 118-124 (FIG. 1). If the threshold (T) has not been exceeded, then the port monitoring component 106 (FIG. 1) of switch 142 (FIG. 1) would continue to receive and monitor for out of order and/or dropped data packets within an exchange (404). If the threshold (T) has been exceeded, then a message may be sent to the administrator including status details corresponding to the information written on the table or log the switch (418).

For example, if the predetermined threshold (T) was set to 2,000,000,000,000, then the port monitoring component 104 (FIG. 1) of computer 102 (FIG. 1) will determine based on the status report information whether the number of dropped and/or out of order data packets exceeds 2,000,000,000,000. If the port monitoring component 106 (FIG. 1) on the switch 142 (FIG. 1) determines that the threshold (T) of 2,000,000,000,000 data packets being dropped and/or out of order is exceeded (416), then a message may be sent to the administrator with status details (418). The message may include which switch port the threshold (T) was exceeded and previously recorded header details of the dropped and/or out of order data packets. The header portion may include information, such as the source id, destination id, sequence information and exchange information. It may also include port information, such as, the world wide port name.

Figure 5:
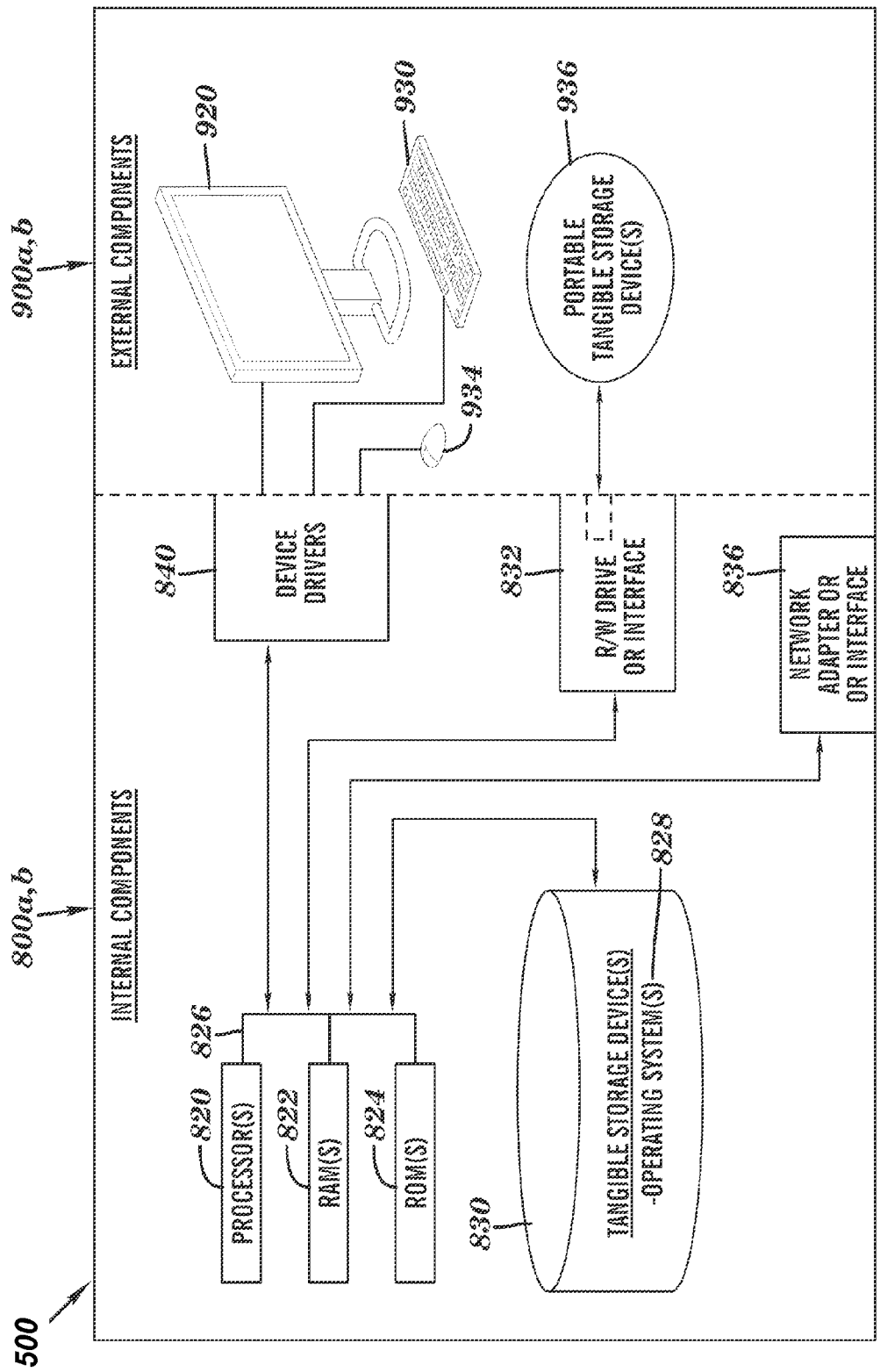
FIG. 5 is a block diagram of hardware and software within the computer of FIG. 1 in accordance with an embodiment of the present invention.

FIG. 5 shows a block diagram of the components of a data processing system 800, 900, such as a computing device 102 (FIG. 1) in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computing devices 102, 142, 144, and 146 (FIG. 1) may include respective sets of internal components 800a, b, c and external components 900a, b, c illustrated in FIG. 5. Each of the sets of internal components 800a, b, c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs 104, 106, 108, 110 (FIG. 1) in respective computing devices 102, 142, 144, and 146 (FIG. 1) is stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, c also includes a R/W drive or interface 832 to read from and write to one or more portable computer-readable tangible storage devices 936 such as a CD-ROM, DVD, memory stick, magnetic tape, magnetic disk, optical disk or semiconductor storage device. The port monitoring component programs 300 (FIGS. 3A-3B), 400 (FIGS. 4A-4B) associated with computing devices 102, 142, 144, and 146 (FIG. 1) can be stored on one or more of the respective portable computer-readable tangible storage devices 936, read via the respective R/W drive or interface 832 and loaded into the respective hard drive 830.

Each set of internal components 800a, b, c may also include network adapters (or switch port cards) or interfaces 836 such as a TCP/IP adapter cards, wireless wi-fi interface cards, or 3G or 4G wireless interface cards or other wired or wireless communication links. Port monitoring component programs 300 (FIGS. 3A-3B) & 400 (FIGS. 4A-4B), in computing devices 102, 142, 144, and 146 (FIG. 1) can be downloaded to computing devices 102, 142, 144, and 146 (FIG. 1) from an external computer (e.g., server) via a network (for example, the Internet, a local area network or other, wide area network) and respective network adapters or interfaces 836. From the network adapters (or switch port adaptors) or interfaces 836, the port monitoring component programs 300 (FIGS. 3A-3B) & 400 (FIGS. 4A-4B) associated with computing devices 102, 142, 144, and 146 (FIG. 1) are loaded into the respective hard drive 830. The network may comprise copper wires, optical fibers, wireless transmission, routers, firewalls, switches, gateway computers and/or edge servers.

Each of the sets of external components 900a, b, c can include a computer display monitor 920, a keyboard 930, and a computer mouse 934. External components 900a, b, c can also include touch screens, virtual keyboards, touch pads, pointing devices, and other human interface devices. Each of the sets of internal components 800a, b, c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A processor-implemented method for analyzing dropped or out of order data packets that are sent from an initiating device over a communications network, comprising:

receiving, by a processor, a predetermined plurality of test data packets from the initiating device over the communications network;

determining, by the processor, at least one of the predetermined plurality of test data packets that are dropped or received out of order, wherein the at least one of the predetermined plurality of test data packets are dropped based on determining header information that is corrupt, and wherein the header information is determined to be corrupt based on determining at least one of missing header information, invalid header information, and unreadable header information;

accessing, by the processor, a header portion corresponding to the at least one of the predetermined plurality of test data packets that are dropped or received out of order, wherein the accessed header portion comprises information associated with a network communication device at which the at least one of the predetermined plurality of test data packets that are dropped or received out of order, wherein the network communication device comprises a switch device and a network adapter device, wherein the information associated with the network communication device comprises switch port information corresponding to the switch device and network adaptor information corresponding to the network adaptor device;

writing, by the processor, the header information of the at least one of the predetermined plurality of test data packets that are dropped or received out of order into a table or log on the network communications device; and sending, by the processor, the accessed header portion to the initiating device, wherein the accessed header portion includes information associated with a device location at which the one or more of the predetermined plurality of test data packets are dropped or received out of order.

2. The processor-implemented method of claim 1, wherein the information associated with the device location comprises at least one of switch port information and network adaptor information.

3. The processor-implemented method of claim 1, wherein the accessed header portion further includes a source and destination address for the at least one of the predetermined plurality of test data packets that are dropped or received out of order.

4. The processor-implemented method of claim 1, wherein the accessed header portion further includes error detection codes for the at least one of the predetermined plurality of test data packets that are dropped or received out of order.

5. The processor-implemented method of claim 1, wherein the accessed header portion further includes sequencing information for the at least one of the predetermined plurality of test data packets that are dropped or received out of order.

6. The processor-implemented method of claim 1, further comprising:

activating, by the processor, a timer having a time value; and comparing, by the processor, the time value with a predetermined time limit.

7. The processor-implemented method of claim 6, further comprising:

identifying, by the processor, one or more of the predetermined plurality of test data packets as being dropped based on the one or more of the predetermined plurality of test data packets failing to arrive prior to the time value exceeding the predetermined time limit.

8. A processor-implemented method for analyzing dropped or out of order data packets that are sent from an initiating device over a communications network, comprising:

monitoring, by a processor, a plurality of ports corresponding to a network communication device, wherein the network communication device comprises a switch device and a network adapter device;

setting, by the processor, a defined threshold for a number of dropped or out of order data packets in an exchange with the network communication device;

receiving, by the processor, a plurality of data packets in the exchange from the initiating device to the network communication device via the communications network;

determining, by the processor, at least one of the of the data packets in the exchange that are dropped or received out of order, wherein the at least one of the data packets in the exchange that are dropped based on determining header information that is corrupt, and wherein the header information is determined to be corrupt based on determining at least one of missing header information, invalid header information, and unreadable header information;

accessing, by the processor, a header portion corresponding to the at least one of the data packets in the exchange that are dropped or received out of order, wherein the accessed header portion comprises information associated with the network communication device at which the one or more of the data packets in the exchange are dropped or received out of order, wherein the information associated with the network communication device comprises switch port information corresponding to the switch device and network adaptor information corresponding to the network adaptor device and writing, by the processor, the header information of the at least one of the data packets in the exchange that are dropped or received out of order into a table or log on the network communications device.

9. The processor-implemented method of claim 8, further comprising:

sending, by the processor, the accessed header portion of the at least one of the data packets in the exchange that are dropped or received out of order to the initiating device.

10. The processor-implemented method of claim 8, wherein the information associated with the network communication device comprises network communication device location information.

11. The processor-implemented method of claim 8, wherein the accessed header portion further includes a source and a destination address for the at least one of the data packets in the exchange that are dropped or received out of order.

12. The processor-implemented method of claim 8, wherein the accessed header portion further includes error detection codes for the at least one of the data packets in the exchange that are dropped or received out of order.

13. The processor-implemented method of claim 8, wherein the accessed header portion further includes sequencing information for the at least one of the data packets in the exchange that are dropped or received out of order.

14. The processor-implemented method of claim 8, further comprising:

activating, by the processor, a threshold having a numerical value; and comparing, by the processor, the threshold with the number of data packets that are dropped or received out of order in the exchange.

15. The processor-implemented method of claim 8, wherein the initiating device is a host or a server running central monitoring software.

16. A non-transitory computer-readable recording medium for storing a computer program for analyzing dropped or out of order data packets that are sent from an initiating device over a communications network, wherein the computer program comprises:

receiving a predetermined plurality of test data packets from the initiating device over the communications network;

determining at least one of the predetermined plurality of test data packets that are dropped or received out of order, wherein the at least one of the predetermined plurality of test data packets are dropped based on determining header information that is corrupt, and wherein the header information is determined to be corrupt based on determining at least one of missing header information, invalid header information, and unreadable header information;

accessing a header portion corresponding to the at least one of the predetermined plurality of test data packets that are dropped or received out of order, wherein the accessed header portion comprises information associated with a network communication device at which the at least one of the predetermined plurality of test data packets that are dropped or received out of order, wherein the network communication device comprises a switch device and a network adapter device, wherein the information associated with the network communication device comprises switch port information corresponding to the switch device and network adaptor information corresponding to the network adaptor device;

writing the header information of the at least one of the predetermined plurality of test data packets that are dropped or received out of order into a table or log on the network communications device; and sending the accessed header portion to the initiating device, wherein the accessed header portion includes information associated with a device location at which the one or more of the predetermined plurality of test data packets are dropped or received out of order.

17. A system for analyzing dropped or out of order data packets that are sent from an initiating device over a communications network comprising:

a memory; and a processor disposed in communication with the memory and configured to issue processing instructions stored in the memory to:

receive a predetermined plurality of test data packets from the initiating device over the communications network;

determine at least one of the predetermined plurality of test data packets that are dropped or received out of order, wherein the at least one of the predetermined plurality of test data packets are dropped based on determining header information that is corrupt, and wherein the header information is determined to be corrupt based on determining at least one of missing header information, invalid header information, and unreadable header information;

access a header portion corresponding to the at least one of the predetermined plurality of test data packets that are dropped or received out of order, wherein the accessed header portion comprises information associated with a network communication device at which the at least one of the predetermined plurality of test data packets that are dropped or received out of order, wherein the network communication device comprises a switch device and a network adapter device, wherein the information associated with the network communication device comprises switch port information corresponding to the switch device and network adaptor information corresponding to the network adaptor device;

write the header information of the at least one of the predetermined plurality of test data packets that are dropped or received out of order into a table or log on the network communications device; and send the accessed header portion to the initiating device, wherein the accessed header portion includes information associated with a device location at which the one or more of the predetermined plurality of test data packets are dropped or received out of order.

* * * * *